United States Patent
Drevet

(10) Patent No.: US 7,323,961 B2
(45) Date of Patent: Jan. 29, 2008

(54) ELECTROMAGNETIC MACHINE WITH A DEFORMABLE MEMBRANE

(75) Inventor: Jean-Baptiste Drevet, Paris (FR)

(73) Assignee: S.A.M. Amstar, Monaco (MC)

( * ) Notice: Subject to any disclaimer, the term of this patent is extended or adjusted under 35 U.S.C. 154(b) by 67 days.

(21) Appl. No.: 10/577,466

(22) PCT Filed: Oct. 26, 2004

(86) PCT No.: PCT/FR2004/002748

§ 371 (c)(1),
(2), (4) Date: Apr. 27, 2006

(87) PCT Pub. No.: WO2005/043717

PCT Pub. Date: May 12, 2005

(65) Prior Publication Data

US 2007/0040636 A1    Feb. 22, 2007

(30) Foreign Application Priority Data

Oct. 29, 2003    (FR) .................................. 03 12671

(51) Int. Cl.
*F04F 7/00* (2006.01)
*H01F 7/00* (2006.01)
(52) U.S. Cl. ...................................... 335/229; 417/395

(58) Field of Classification Search ................ 417/240, 417/241, 394, 395, 410.1, 412, 413.1–413; 335/229–234
See application file for complete search history.

(56) References Cited

U.S. PATENT DOCUMENTS

| 4,063,826 A | * | 12/1977 | Riepe | ...................... 417/410.1 |
| 4,484,095 A | | 11/1984 | Neumann | |
| 2001/0001278 A1 | | 5/2001 | Drevet | |

FOREIGN PATENT DOCUMENTS

DE        101 61 132        6/2003

* cited by examiner

*Primary Examiner*—Ramon M. Barrera

(57) ABSTRACT

An electromagnetic machine with a deformable membrane (1) includes at least one fixed part which can direct a magnetic flow interacting with at least one moveable part (12) having regions which are magnetically polarized in order to ensure that alternative displacement of the moveable part (12) corresponds to an alternative variation of the magnetic flow in the fixed part, the moveable part (12) being kinetically linked to an edge (5) of the membrane (1) such that an undulation of the membrane (1) corresponds to an alternative displacement of the moveable part (12), wherein the fixed part and moveable part (12) are arranged in such a way that the moveable part (12) can be displaced in a rotating manner.

9 Claims, 4 Drawing Sheets

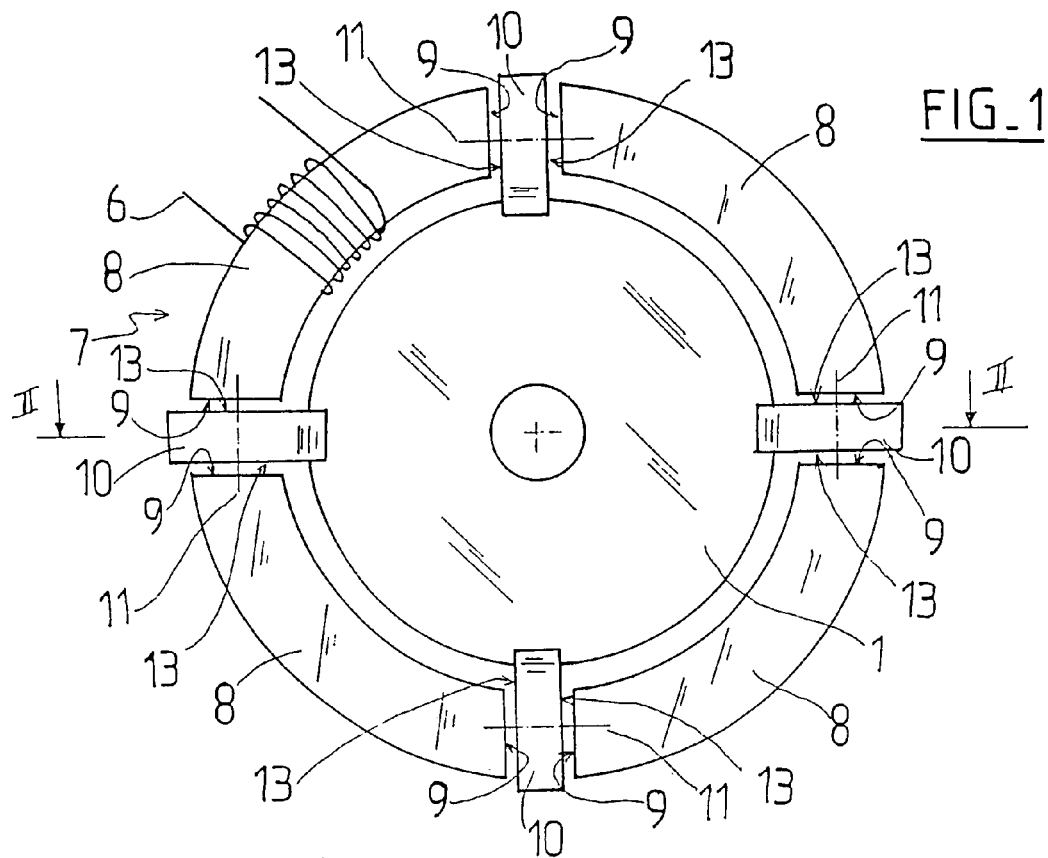
FIG_1
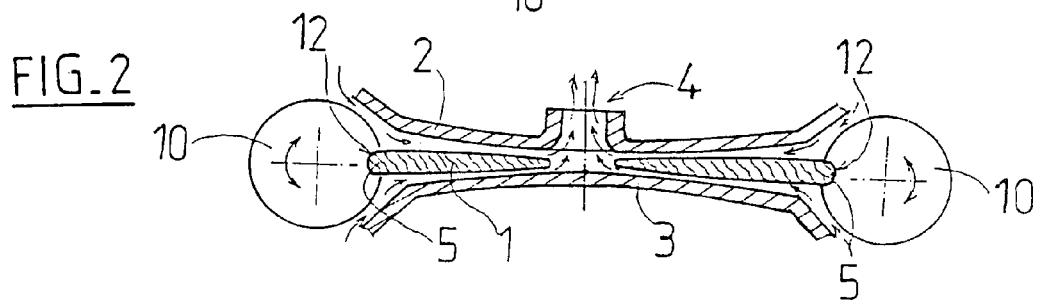
FIG_2
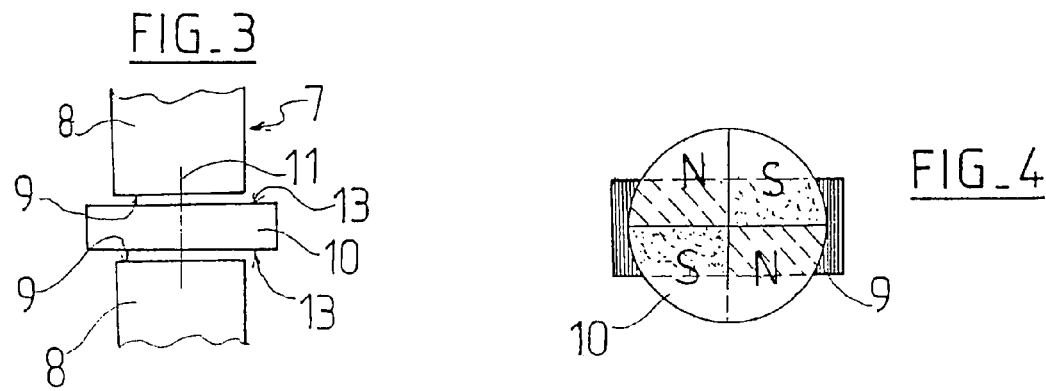
FIG_3
FIG_4

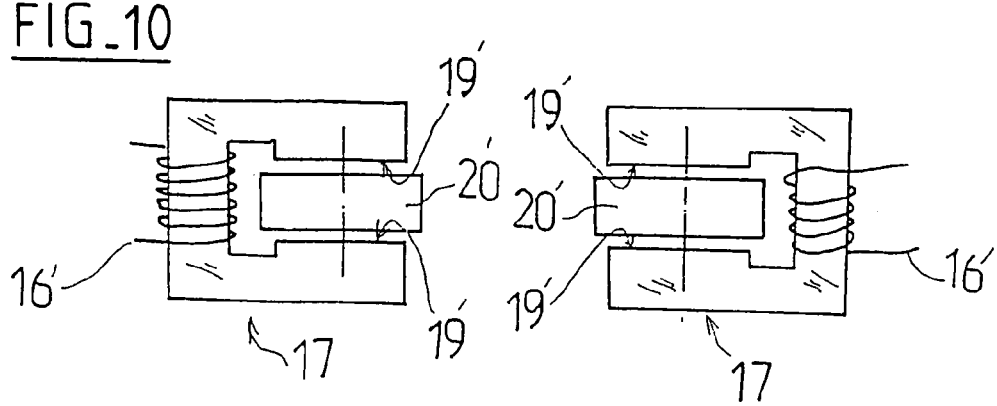
FIG_10
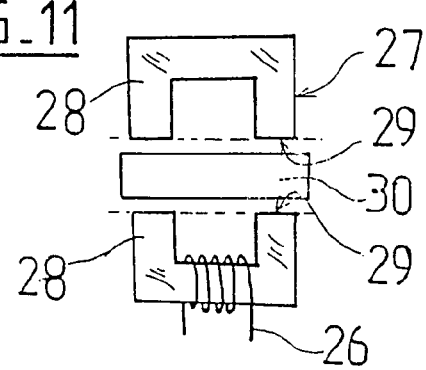
FIG_11
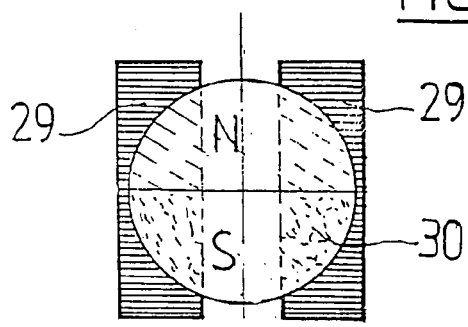
FIG_12
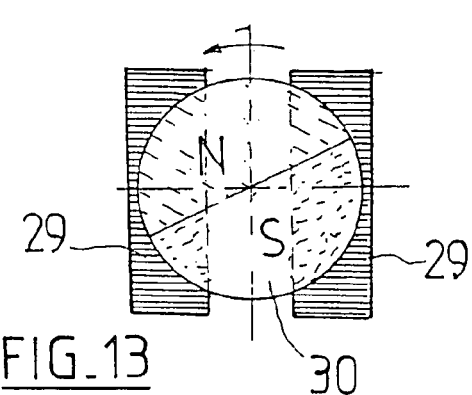
FIG_13
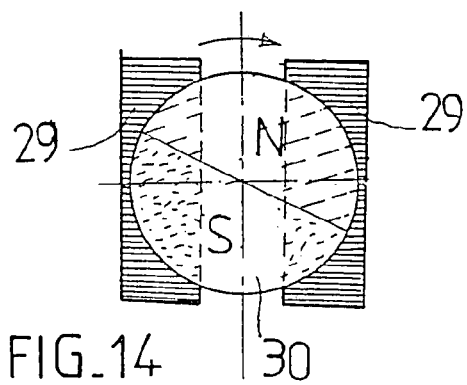
FIG_14
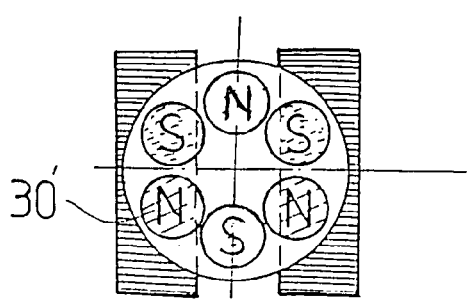
FIG_15

ELECTROMAGNETIC MACHINE WITH A DEFORMABLE MEMBRANE

The invention relates to an electromagnetic machine with a deformable diaphragm.

BACKGROUND OF THE INVENTION

Machines are known having a deformable diaphragm that is driven by an electromagnetic motor comprising at least a stationary part adapted to channel an electromagnetic flux acting on at least one moving part so as to cause said moving part to move with linear alternating motion in response to alternating variation in the magnetic flux.

By way of example, the machine illustrated in U.S. Pat. No. 6,361,284 comprises a diaphragm disposed between two rigid plates to undulate under the action of an electromagnetic motor in which the moving part is rigidly connected to an edge of the diaphragm so that. alternating motion of the moving part causes the diaphragm to undulate perpendicularly to its plane.

It has been found that such machines emit noise, which even though not of large acoustic power, can nevertheless be troublesome in installations in which the machine is in operation frequently, or even continuously, such as aquariums or refrigerators, for example.

Some of this noise is attributed to the fact that the moving part of the motor, during its alternating motion, drives pulses of air that produce a coherent sound wave.

Furthermore, the moving part presents inertia that is not negligible compared to that of the stationary part. The alternating motion of the moving part thus causes the stationary part to vibrate, thereby in turn causing the support of the machine to vibrate, and constituting an additional source of noise.

OBJECT OF THE INVENTION

The object of the invention is to propose an electromagnetic machine with a deformable diaphragm in which operation is particularly quiet.

BRIEF SUMMARY OF THE INVENTION

To this end, the invention provides an electromagnetic machine with a deformable diaphragm, the machine comprising at least one stationary part suitable for channeling a magnetic flux that interacts with at least one moving part having regions that are magnetically polarized in such a manner that alternating displacement of the moving part and alternating magnetic flux variation in the stationary part correspond, the moving part being drivingly connected to an edge of the diaphragm such that alternating displacement of the moving part corresponds to deformation of the diaphragm, wherein the stationary part and the moving part are arranged to confer rotary type displacement to the moving part.

Thus, during the alternating rotary motion of the moving part, the air surrounding the moving part is set into motion essentially by alternating shear, which does not produce any coherent soundwaves.

In addition, the machine is no longer subjected to alternating linear vibration, other than that generated by the motion and deformations of the diaphragm which are small in amplitude and which therefore induce little noise.

A machine of the invention is thus substantially less noisy than prior machines.

Preferably, the moving part(s) is/are substantially circularly cylindrical in shape and is/are constrained to turn substantially about its/their geometrical axis (or axes).

Thus, the moving part does not drive any displacement of the air, other than in shear in the immediate proximity of the walls of the moving part. This type of moving part makes the operation of the machine particularly silent.

In a particular embodiment, the or each stationary part comprises at least one coil having a core passing therethrough to form a magnetic path for the magnetic flux, which path is interrupted by one or more spaces extending between pairs of active walls of the core, the or each moving part comprising a body defined by two parallel faces between which there extend magnetically polarized regions that are disposed in circumferential manner so that two adjacent regions have opposite polarities, the or each moving part being disposed in a space of the core in such a manner that the faces of the active portions of the moving part extend facing the active walls of the core.

Advantageously, the active walls of the core extend facing a central portion of the facing moving part and present an area that is less than the area of the magnetically polarized regions of said moving part.

In a particular disposition, the edge of the diaphragm is engaged in a peripheral notch of the moving part. In a variant, a connection member extends between the edge of the diaphragm and the moving part.

In a particular embodiment, the diaphragm is circular or tubular, and the electromagnetic machine has a plurality of moving parts arranged to be diametrically opposite in pairs and to turn in opposite directions.

In an advantageous aspect of the invention, the moving parts present unbalance disposed to compensate for the alternating inertial forces of the diaphragm.

Advantageously, the diaphragm extends between two rigid plates of shapes that are adapted to impart traveling wave motion to the diaphragm when the diaphragm is driven by the moving parts.

BRIEF DESCRIPTION OF THE DRAWINGS

The invention can be better understood in the light of the following description given with reference to the accompanying figures, in which:

FIG. 1 is a diagram showing the principle of a circular diaphragm pump in a first embodiment of the invention;

FIG. 2 is a section view on line II-II of the FIG. 1 pump;

FIG. 3 is a fragmentary view showing one of the rotors of the electromagnetic motor of FIG. 1;

FIG. 4 is a face view showing the FIG. 3 rotor in its equilibrium position;

FIG. 10 is a view analogous to FIG. 9 showing a variant embodiment of the motor of the FIG. 8 pump;

FIG. 11 is a diagram showing the principle of an electromagnetic motor in another embodiment of the invention;

FIG. 12 is a face view showing the FIG. 11 rotor in its equilibrium position;.

FIG. 13 is a view analogous to FIG. 12 showing the rotor while turning in a first direction;

FIG. 14 is a view analogous to FIG. 13 showing the rotor while turning in a second direction;

FIG. 15 is a view analogous to FIG. 12 showing a variant embodiment of the rotor;

DETAILED DESCRIPTION OF THE INVENTION

Figure 5:
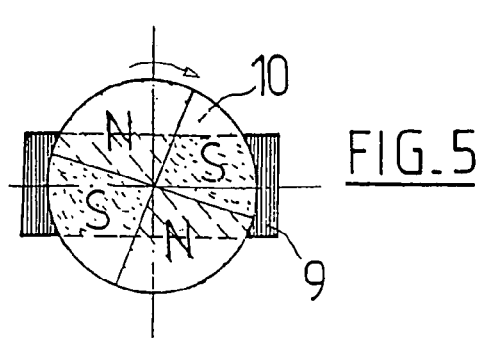
FIG. 5 is a view analogous to FIG. 4 showing the rotor while turning in a first direction.

With reference to FIGS. 1 and 2, a pump in a first embodiment of the invention comprises a circular deformable diaphragm 1, in this example made of elastomer, constrained to vibrate perpendicularly to its own plane between two rigid plates 2 and 3 as can be seen in section in FIG. 2. Vibration of the diaphragm 1 acts in known manner to suck fluid in through inlets situated at the periphery of the diaphragm 1, the fluid being forced by the vibration of the diaphragm towards a central opening in one of the plates, following the path represented by arrows in FIG. 2.

In this example, the pump is of the undulating diaphragm type. As already known from U.S. Pat. No. 6,361,284, the plates are shaped to damp a wave reflected from the diaphragm that would otherwise propagate from the central opening towards the periphery, so that the diaphragm vibrates with a traveling wave that enables energy to be transferred from the vibration of the diaphragm to the fluid in the form of kinetic energy, thus causing said fluid to move towards the central opening.

The diaphragm 1 is constrained to vibrate perpendicularly to its plane by means of an electromagnetic motor comprising:

a stationary part or stator that comprises a coil 6 and a core 7 of ferromagnetic material (preferably constituted by a stack of laminations). The core 7 is made up of branches 8 one of which passes through the coil 6, each branch having two ends that are terminated by respective faces 9 extending parallel to similar faces at the ends of adjacent branches. The facing faces 9 together form respective pairs of active walls 9 of the core 7, defining between them respective spaces in the core 7; and moving parts or rotors 10 of circularly cylindrical shape, having magnetically polarized regions extending between two parallel faces 13, and being disposed in the spaces that exist between the pairs of active walls of the core 7. It should be observed that said spaces are disposed angularly in regular manner such that the rotors 10 are diametrically opposite in pairs. As can be seen in FIG. 2, each rotor 10 includes a peripheral notch 12 having a portion of the edge 5 of the diaphragm 1 engaged therein.

When the coil 6 is powered with alternative current (AC), that generates an alternating magnetic field which travels in the branches 8 of the core 7 and passes through the rotors 10. As explained below with reference to FIGS. 3 to 7, this drives synchronous alternating rotary motion of the rotors 10 about respective axes 11 that coincide substantially with their geometrical axes.

The diametrically opposite rotors 10 turn in opposite directions, such that the portions of the edge 5 of the diaphragm 1 engaged in the notches 12 in the rotors 10 are simultaneously raised and lowered synchronously, at the rate of the alternating rotary motion of the rotors 10. The edge 5 of the diaphragm 1 is thus constrained to oscillate perpendicularly to the plane of the diaphragm 1, thus causing it to vibrate perpendicularly to its plane.

The diaphragm 1 is thus caused to vibrate by using moving parts (the rotors 10) that perform rotary motion only, that are circularly cylindrical in shape, and that therefore give rise to no pulsed displacement of air that could give rise to a coherent sound source.

Furthermore, by turning the rotors 10 that are diametrically opposite in opposite directions, the inertial forces generated by said rotors turning naturally cancel in pairs, thus eliminating a potential source of vibration and thus of noise.

In addition, the presence of the notch 12 causes the centers of gravity of the rotors 10 to be offset a little away from their notches. Since the rotors 10 turn substantially about their geometrical axes, this offset leads to unbalance, thereby constituting a mass that balances the inertial forces generated by the oscillations of the diaphragm 1. This natural balancing also contributes to reducing pump vibration (and thus noise).

The operating principle of the electromagnetic motor of the pump is explained below with reference to FIGS. 3 to 7.

FIG. 3 shows a portion of the electromagnetic motor comprising a rotor 10 disposed in the space between two active walls 9 of the core 7. It can be seen that the parallel faces 13 of the rotor 10 extend with a small airgap facing each active wall 9 of the core 7.

The rotor 10 is made of metal that has been subjected to metallurgical treatment conferring four magnetized sectors (with the direction of magnetization extending from one face to the other of each rotor 10), these sectors being disposed in such a manner that two adjacent sectors are of opposite polarities, referenced N and S (for north and south respectively), as can be seen in FIG. 4. The four sectors form magnetically polarized regions that subdivide the rotor 10 into four portions of equal area, the sectors being centered on the geometrical axis 11 of the rotor 10.

At rest, when the coil 6 is not powered, the rotor 10 takes up a position as shown in FIG. 4 in which the north and south sectors N and S present areas facing the active walls 9 that are all the same. To visualize this area identity more clearly, the area presented by each sector N facing the active walls 9 is emphasized by shading with chain-dotted lines, while the area presented by each sectors S facing the active walls 9 is emphasized by a stippling of dots.

This position is a stable equilibrium position and corresponds to maximum closure of the magnetic flux induced by the magnetized sectors of the rotor 10 in the adjacent branches 8 of the core 7. When the rotor 10 is moved angularly away from this position, an electromagnetic return force acts on the rotor 10 to return it into the equilibrium position.

The return force also acts against any linear displacement (in particular vertical displacement) of the rotor 10. The rotor is thus naturally held in levitation in its equilibrium position, thus avoiding any need to use a supporting pin or spring, thereby contributing to the simplicity of the motor, and to its silent operation.

This stability is due firstly to the non-circular shape of the active walls 9 of the core 7, and secondly to the dimensions of said active walls each of which presents an area facing a face of the rotor 10 that is smaller than the sum of the areas of the magnetically polarized regions. This stability is also due to the fact that the active walls extend facing a central region of the faces of the rotor 10.

A magnetic flux generated by the coil 6 in the core 7 changes the equilibrium and causes the rotor 10 to turn about its geometrical axis 11 in a direction that tends to increase the area presented facing the active walls 9 by those of its sectors N or S that are oriented in the same direction as the magnetic flux generated by the coil 6.

Figure 6:
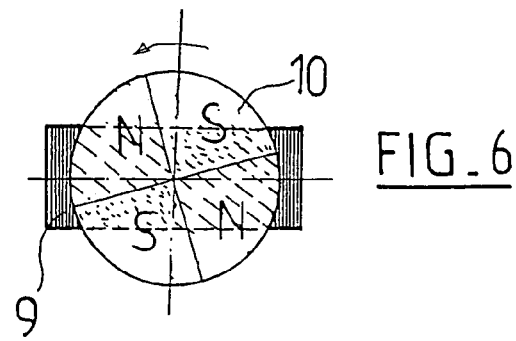
FIG. 6 is a view analogous to FIG. 5 showing the rotor while turning in a second direction.

FIGS. 5 and 6 show the angular positions of the rotor 10 as it turns under the effect of the magnetic field generated by the coil 6. In FIG. 5, the rotor 10 is shown turning in a first direction so that the area of the sectors S facing the active faces 9 tends to increase to the detriment of the area of the sectors N. In FIG. 6, the rotor 10 is shown turning in a second direction for which the area of the sectors N facing the active faces 9 tends to increase to the detriment of the area of the sectors S.

In practice, the rotor 10 oscillates over an angular stroke that depends on the ratio between the intensity of the magnetic field generated by the coil 6 and the inertia of the moving parts of the pump.

Figure 7:
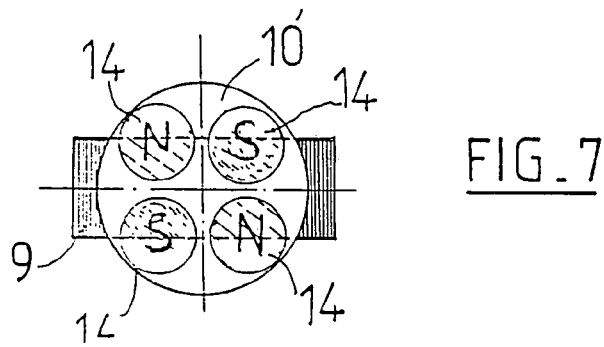
FIG. 7 is a view analogous to FIG. 4 showing a variant embodiment of the invention.

FIG. 7 shows a variant embodiment 10' of the rotor which is constituted by a circularly cylindrical block of resin having segments 14 of a magnetic bar embedded therein, the segments 14 being disposed circumferentially and presenting alternating directions of magnetization. Each of the segments 14 forms a magnetically polarized region. This type of rotor behaves in a manner similar to that described with reference to FIGS. 3 to 6. The position shown in FIG. 7 is the equilibrium position, in which the areas presented by the segments N facing the active walls 9 of the core are equal to the areas presented by the segments S facing the active walls 9.

Figure 8:
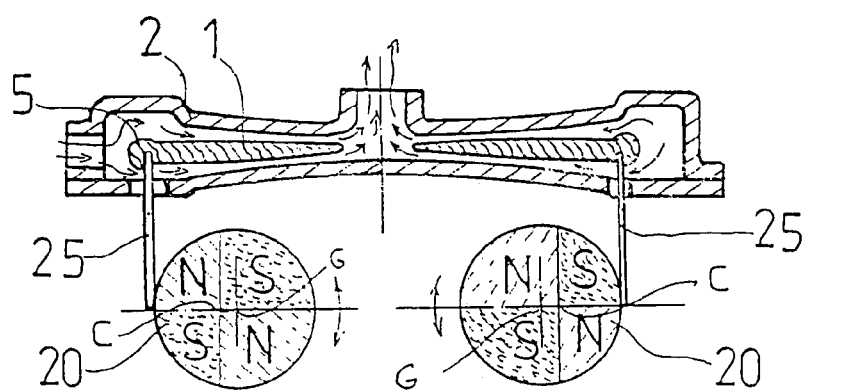
FIG. 8 is a diagram showing the principle of a circular diaphragm pump in a second embodiment of the invention.
Figure 9:
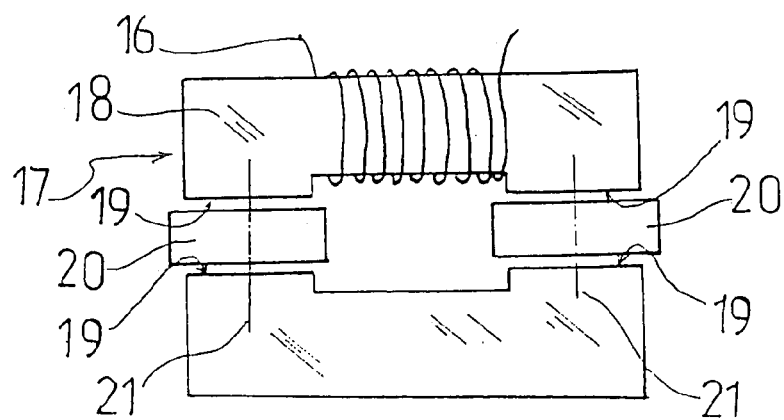
FIG. 9 is a view of the FIG. 8 pump from beneath, showing the electromagnetic motor of the FIG. 8 pump.

In a second embodiment of the invention as shown in FIGS. 8 and 9, the circular vibrator diaphragm 1, still constrained to vibrate between plates 2 and 3, has its edge 5 connected to two rotors 20 by means of flexible metal blades 25 that extend from the edge 5 of the diaphragm so as to meet the peripheries of the rotors 20 tangentially. The blades 25 are secured to the rotors 20 by any suitable means, such as screw fastening or adhesive.

The rotors 20 form portions of an electromagnetic motor also comprising a coil 16 and a core 17 made up of two branches 18 (one of which passes through the coil 16). The branches 18 are terminated by active walls 19 between which the rotors 20 are disposed. The operation of this motor is entirely similar to that described with reference to FIGS. 3 to 7.

The alternating rotary motion of the rotors 20 driven by powering the coil 16 with AC causes synchronized alternating traction/compression forces to be generated in the blades 25, thereby causing the edge 5 of the diaphragm 1 to oscillate in a direction perpendicular to its plane, and thus causing the diaphragm 1 to vibrate.

The rotors 20 turn in opposite directions so that the inertial effects of the rotors 20 turning cancel naturally.

In order to oppose the inertial forces generated by the displacements and the vibration of the diaphragm, it is possible to provide for the rotors 20 to be unbalanced. In a particular embodiment of the invention, it is also possible to offset the axis of rotation of each rotor relative to its center of gravity by causing the magnetically polarized regions to be distributed around an axis that is offset from the center of gravity. As can be seen in FIG. 8, the magnetized sectors N and S are not exactly symmetrical, but extend from a point C that is offset from the center of gravity G of the rotor 20. The offset is exaggerated in the figure to make it more visible.

The center of gravity is thus offset from the center of rotation of the rotor 20, thereby generating unbalance suitable for opposing the inertial forces of the diaphragm 1.

In a variant embodiment, the pump of FIG. 8 does not have a two-rotor motor, but has two motors each having a single rotor, as shown in FIG. 10. Each of the rotors 20' is associated with a core 17' and a coil 16'. The cores 17' are constituted by respective single branches passing through the corresponding coil 16 and extending in the form of a fork so as to present active end walls 19' that face each other.

The coils 16' are associated electrically so that the rotors 20' turn synchronously in opposite directions to each other.

In a variant, the above single-rotor motors can be replaced by single-rotor motors of the kind shown in FIG. 11, comprising a rotor 30 co-operating with a stationary part made up of a coil 26 and a core 27 having two branches 28 (one of which passes through the coil 26). Each branch 28 is generally U-shaped and its ends define respective active walls 29 of the core.

As can be seen in FIG. 12, the rotor 30 has two magnetized sectors (referenced N, S) that are magnetized in opposite directions. In the equilibrium position, as shown in FIG. 12, the sector N presents an area facing the active walls 29 of the core 27 that is equal to the area presented by the sector S facing the active walls of the core.

When the coil 26 is powered, the branches 28 of the core 27 convey the magnetic flux generated by the coil 26 so as to impart opposite polarities at the two ends of a given branch. The rotor 30 is thus caused to turn so as to present the sector having the corresponding polarity facing each end. FIGS. 13 and 14 show the angular positions taken by the rotor 30 as it turns under the effect of the magnetic field generated by the coil 26.

In a variant embodiment shown in FIG. 15, the rotor 30' comprises a block of resin of circularly cylindrical shape having six magnetized bar segments 31 embedded therein, the segments being disposed circumferentially so that adjacent pairs of segments have opposite polarities.

The rotor naturally takes up an equilibrium position as shown in FIG. 15 in which the areas of the segments S facing the core are equal to the areas of the segments N facing the core.

Figure 16:
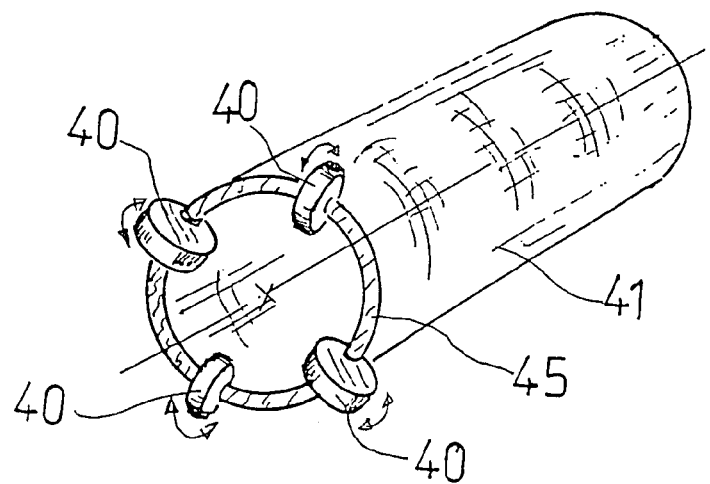
FIG. 16 is a diagram showing the principle of a tubular diaphragm pump of the invention with one of the plates of the pump omitted.

The invention is applicable to pumps having non-plane diaphragms, as shown in FIG. 16, in which the diaphragm 41 is tubular. The rotors 40 are disposed close to an edge 45 of the diaphragm 41 in order to receive said edge in respective notches 52. The diaphragm 41 is tensioned by tensioning means that are not shown. The pump also has an internal plate extending inside the diaphragm and an external plate extending around the diaphragm. These plates are not shown.

The rotors 40 are arranged to turn in opposition in pairs. The synchronized alternating rotary motion of the rotors 40 leads to alternating deformation of the edge 45 of the diaphragm 41. The tension imposed on the diaphragm 41 transforms it into a propagation medium allowing a wave that is generated by the alternating deformation of the edge 45 to propagate from said edge towards the free edge of the diaphragm 41.

Figure 17:
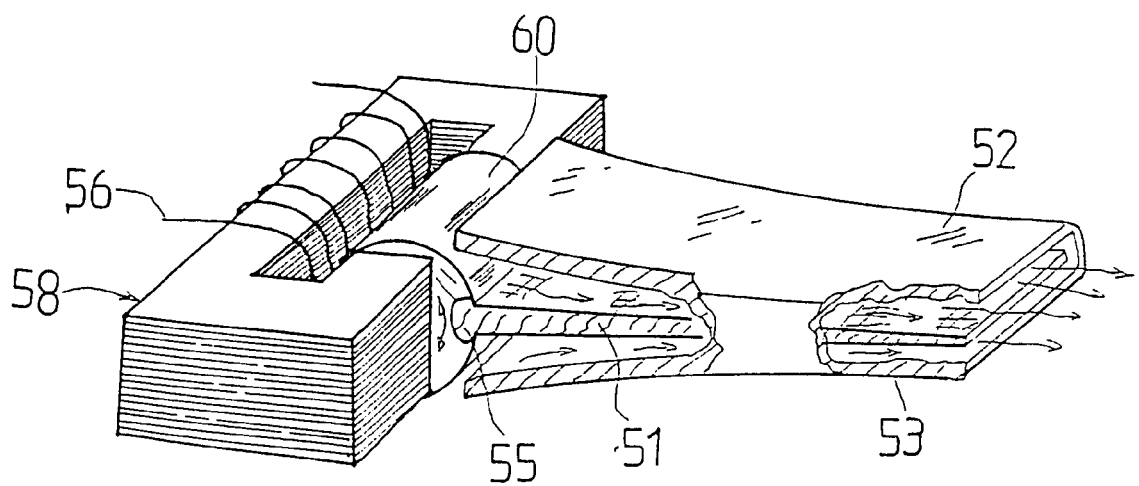
FIG. 17 is a diagram showing the principle of a rectangular diaphragm pump of the invention.

The invention can similarly be applied to a pump having a rectangular diaphragm, as shown in FIG. 17.

One of the edges 55 of the diaphragm 51 is received in the notch of a rotor 60 that co-operates with a stationary part made up of a core 58 passing through a coil 56. The alternating rotary motion of the rotor 60 leads to the edge 55 of the diaphragm 51 oscillating, thereby causing it to undulate between the plates 52 and 53, with the diaphragm 51 being tensioned by tensioner means that are not shown.

The invention is not restricted to the particular embodiments described above, but on the contrary covers any variant coming within the ambit of the invention as defined by the claims.

In particular, although the rotors are being shown as returning naturally towards an equilibrium position by closing the flux of the regions in the core that are magnetically polarized, it is possible to provide rotors that are secured mechanically to the core via respective pivot pins or centering springs.

Although the moving parts are shown as being rotors that are accurately circular, the moving parts could take any other shape, while nevertheless taking care to minimize any pulsed movement of air generated by the alternating rotary motion of the moving part that could give rise to a soundwave.

Although the figures show machines having diaphragms that are associated with respective electromagnetic motors and operating as pumps, it is clear that the invention covers inverse operation of said machines in which the diaphragm is set into vibration by force passage of a fluid, with the vibration of the diaphragm driving alternating oscillations of the rotor(s), thereby generating alternating current in the coil(s).

Although it is stated that the moving parts comprise magnetically polarized regions constituted by magnetized sectors or magnetized bar segments, each of the magnetically polarized regions could be replaced in strictly equivalent manner by a conductor wire coil on an axis extending perpendicularly to the faces of the moving part, the coil being fed with direct current (DC) via a rotary contact or indeed via flexible wires.

Clearly the functions of the stationary part and of the moving part could be inverted, for example by replacing the core with a permanent magnet and providing coils in the moving part that are powered with AC.

The invention claimed is:

1. An electromagnetic machine with a deformable diaphragm (1; 41; 51), the machine comprising at least one stationary part (6, 7; 16, 17; 16', 17'; 26, 27; 56, 57) suitable for channeling a magnetic flux that interacts with at least one moving part (10; 20; 20'; 30; 60) having regions that are magnetically polarized (N, S) in such a manner that alternating displacement of the moving part and alternating magnetic flux variation in the stationary part correspond, the moving part being drivingly connected to an edge (5; 45; 55) of the diaphragm such that alternating displacement of the moving part corresponds to deformation of the diaphragm, wherein the stationary part and the moving part are arranged to confer rotary type displacement to the moving part.

2. A machine according to claim 1, wherein the moving part(s) (10; 20; 20'; 30; 60) is/are substantially circularly cylindrical in shape and is/are constrained to turn substantially about its/their geometrical axis (or axes).

3. A machine according to claim 1, wherein the or each stationary part comprises at least one coil (6; 16; 16'; 56) having a core (7; 17; 17'; 57) passing therethrough to form a magnetic path for the magnetic flux, which path is interrupted by one or more spaces extending between pairs of active walls (9; 19, 19'; 29) of the core, the or each moving part comprising a body defined by two parallel faces (13) between which there extend magnetically polarized regions (N, S) that are disposed in circumferential manner so that two adjacent regions have opposite polarities, the or each moving part (10; 20; 20'; 30; 60) being disposed in a space of the core (7; 17; 17'; 57) in such a manner that the faces of the active portions of the moving part extend facing the active walls of the core.

4. A machine according to claim 3, wherein the active walls (9; 19, 19'; 29) of the core (7; 17; 17'; 57) extend facing a central portion of the facing moving part (10; 20; 20'; 30; 60) and present an area that is less than the area of the magnetically polarized regions of said moving part.

5. A machine according to claim 1, wherein the edge (5; 45; 55) of the diaphragm is engaged in a peripheral notch (12) of the moving part.

6. A machine according to claim 1, wherein a connection member (15) extends between the edge of the diaphragm (1) and the moving part (20).

7. A machine according to claim 1, wherein the diaphragm (1; 41) is circular or tubular, and wherein the electromagnetic machine has a plurality of moving parts (10; 40) arranged to be diametrically opposite in pairs and to turn in opposite directions.

8. A machine according to claim 1, wherein the moving parts (20) present unbalance disposed to compensate for the alternating inertial forces of the diaphragm (1).

9. A machine according to claim 1, wherein the diaphragm (1) extends between two rigid plates (2, 3) of shapes that are adapted to impart traveling wave motion to the diaphragm (1) when the diaphragm is driven by the moving parts (10).

\* \* \* \* \*